(12) United States Patent
Masutani et al.

(10) Patent No.: US 7,212,180 B2
(45) Date of Patent: May 1, 2007

(54) METHOD OF DRIVING LIQUID CRYSTAL DISPLAY DEVICE

(75) Inventors: Yuichi Masutani, Kumamoto (JP); Shingo Nagano, Kumamoto (JP)

(73) Assignee: Advanced Display Inc., Kumamoto (JP)

( * ) Notice: Subject to any disclaimer, the term of this patent is extended or adjusted under 35 U.S.C. 154(b) by 596 days.

(21) Appl. No.: 10/814,259

(22) Filed: Apr. 1, 2004

(65) Prior Publication Data
US 2004/0196243 A1  Oct. 7, 2004

(30) Foreign Application Priority Data
Apr. 1, 2003  (JP) .............................. 2003-098579

(51) Int. Cl.
*G09G 3/36* (2006.01)
(52) U.S. Cl. .......................................... 345/87; 345/96
(58) Field of Classification Search ................ 345/87, 345/89, 90, 92, 96; 349/43, 138, 139, 141; 257/59
See application file for complete search history.

(56) References Cited

FOREIGN PATENT DOCUMENTS

| JP | 11-282431 | * 10/1999 | ...................... 3/36 |
|---|---|---|---|
| JP | 2001-337310 | 12/2001 | |

* cited by examiner

Primary Examiner—Richard Hjerpe
Assistant Examiner—Abbas Abdulselam
(74) Attorney, Agent, or Firm—Oblon, Spivak, McClelland, Maier & Neustadt, P.C.

(57) ABSTRACT

A method of driving a liquid crystal display device of IPS mode is disclosed. The liquid crystal display device includes a pair of substrates, a liquid crystal layer placed between the substrates, gate lines placed above one of the substrates, source lines placed to cross the gate lines with an insulative layer interposed therebetween, a switching element placed near the crossing point of the gate lines and the source lines, and a pixel electrode connected to the source lines through the switching element. A signal voltage required for image display is supplied to the pixel electrode by the source line through the switching element. The method sets an average value of the signal voltage in such a way that an average value of a positive polarity voltage and a negative polarity voltage of the pixel electrode varies with a grayscale to be displayed, and inputs the average value of the signal voltage to the pixel electrode.

4 Claims, 5 Drawing Sheets

METHOD OF DRIVING LIQUID CRYSTAL DISPLAY DEVICE

BACKGROUND OF THE INVENTION

1. Field of the Invention

The present invention relates to a method of driving an active matrix liquid crystal display device of in-plane switching mode.

2. Related Background Art

Conventional liquid crystal display devices undesirably produce image sticking, in which, when leaving an unchanging image on a screen for a long period of time, a faint remnant of the image remains even after a new image has replaced it. A driving method used to overcome this problem is offset correction to correct the grayscale dependence of voltage drop induced by a gate signal. Another driving method for reducing the image sticking and eliminating flicker in a twisted nematic (TN) liquid crystal display device is as follows. In a grayscale where a source signal has a large amplitude, the voltage of a common signal and the center voltage of the source signal are set to such values as to compensate the voltage drop inducted by a gate signal. In a grayscale where the source signal has a small amplitude, on the other hand, the center voltage of the source signal is set to a value higher than the above center voltage of the source signal for compensating the voltage drop induced by the gate signal. This method is disclosed in Japanese Unexamined Patent Application Publication No. 2001-337310, pp. 2–5, and illustrated in FIG. 8–9, for example.

However, if the driving method described in the above application is applied to a liquid crystal cell of in-plane switching (IPS) mode, it is unable to prevent the image sticking. The liquid crystal cell of the IPS mode has electrodes parallel to each other, which is different from that of the TN mode having electrodes opposite to each other, and a residual DC voltage is more likely to be retained in the IPS mode than in the TN mode, causing the image sticking.

SUMMARY OF THE INVENTION

In view of the foregoing, it is an object of the present invention to provide a method of driving a liquid crystal display device capable of reducing image sticking in a liquid crystal display device of IPS mode, not by a conventional offset correction of setting an optimum value of Vcom for preventing unequal DC components between a pixel electrode voltage and a common electrode voltage, but by setting an offset value for preventing residual vertical DC voltages and image sticking.

To these ends, according to one aspect of the present invention, there is provided a method of driving a liquid crystal display device of in-plane-switching (IPS) mode for applying an electric field substantially parallel to a substrate surface, having a pair of substrates, a liquid crystal layer placed between the pair of substrates, a plurality of gate lines placed above one of the pair of substrates, a plurality of source lines placed to cross the gate lines with an insulative layer interposed therebetween, a switching element placed in a near proximity to a crossing point of the gate lines and the source lines, and a pixel electrode connected to the source lines through the switching element, to which a signal voltage required for image display is supplied by the source line through the switching element, the method including a step of setting an average value of the signal voltage in such a way that an average value of a positive polarity voltage and a negative polarity voltage of the pixel electrode varies with a grayscale to be displayed, and a step of inputting the average value of the signal voltage to the pixel electrode. This method is capable of minimizing image sticking in IPS liquid crystal display devices.

In the above method, the average value of the signal voltage may be an average of two values of grayscale reference voltages input to a source line drive circuit for generating the signal voltage from an external unit.

According to another aspect of the present invention, there is provided a liquid crystal display device of in-plane-switching (IPS) mode for applying an electric field substantially parallel to a substrate surface, including a pair of substrates, a liquid crystal layer placed between the pair of substrates, a plurality of gate lines placed above one of the pair of substrates, a plurality of source lines placed to cross the gate lines with an insulative layer interposed therebetween, a switching element placed in a near proximity to a crossing point of the gate lines and the source lines, and a pixel electrode connected to the source lines through the switching element, to which a signal voltage required for image display is supplied by the source line through the switching element, wherein an average value of the signal voltage supplied by the source line is set in such a way that an average value of a positive polarity voltage and a negative polarity voltage of the pixel electrode varies with a grayscale to be displayed. This IPS liquid crystal display device is capable of minimizing image sticking.

In the above liquid crystal display device of in-plane-switching mode, the average value of the signal voltage may be an average of two values of grayscale reference voltages input to a source line drive circuit for generating the signal voltage from an external unit.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

A transmissive liquid crystal display device applies an electric field to liquid crystal filled between two substrates and controls the alignment of liquid crystal molecules according to the strength of the electric field, thereby adjusting the amount of light passing through the substrate to produce an image with a desired brightness. In an active matrix liquid crystal display device with a switching element comprising a thin film transistor (TFT) and so on, in-plane switching (IPS) mode that applies an electric field parallel to a substrate to liquid crystal is used as a technique to obtain an extremely wide viewing angle. The IPS mode operation can minimize viewing-angle-based grayscale inversion and deterioration in contrast ratio.

Figure 1A:
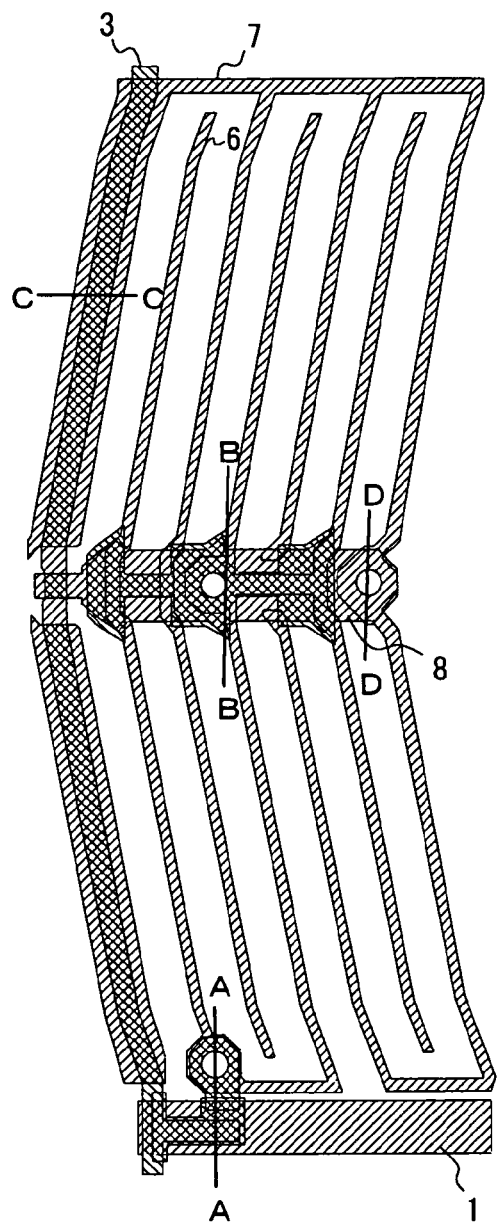
FIG. 1A is a view showing a liquid crystal display device according to an embodiment of the present invention.
Figure 1B:
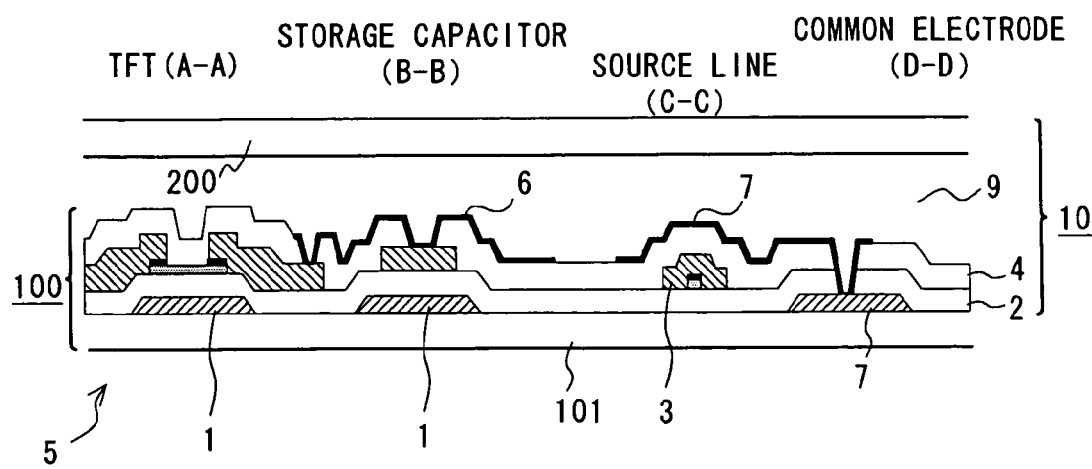
FIG. 1B is a cross sectional view of the liquid crystal display device in FIG. 1A.

Referring first to FIG. 1A, a plan view of a pixel area of a standard IPS liquid crystal display device is shown. FIG. 1B is a sectional view thereof. The liquid crystal display device has a TFT array substrate 100 and a color filter substrate 200.

The TFT array susbtrate 100 has a plurality of gate lines 1 placed on an insulative substrate 101, an insulative layer 2 placed over the gate lines, a source line 3 placed to cross the plurality of gate lines 1, and an insulative layer 4 placed over the source line 3. The gate lines 1 and the source line 3 are connected to a switching element such as TFT placed at their crossing point. A V-shaped comb-type pixel electrode 6 consisting of a plurality of electrodes placed parallel to the source line 3 is connected to the switching element 5. A V-shaped comb-type common electrode 7 also consists of a plurality of electrodes, placed parallel to and alternating with the plurality of electrodes of the pixel electrode 6. The pixel electrode 6 is formed by a metal such as chromium (Cr), aluminum (Al), and molybdenum (Mo), or a transparent conductive film such as Indium Tin Oxide (ITO). A storage capacitor line 8, formed by a metal such as chromium (Cr), aluminum (Al), and molybdenum (Mo), is connected to the common electrode 7 through a through-hole. The TFT array substrate 100 and the color filter substrate 200 are placed face to face and a liquid crystal layer 9 is interposed between, which makes up a liquid crystal panel 10. Further, a backlight and other components are set to the liquid crystal panel 10, thereby producing a liquid crystal display device. A voltage is applied to the liquid crystal layer 9 between the pixel electrode 6 and the common electrode 7, and an electric field substantially parallel to the substrate is thus applied to the liquid crystal layer 9.

Figure 6A:
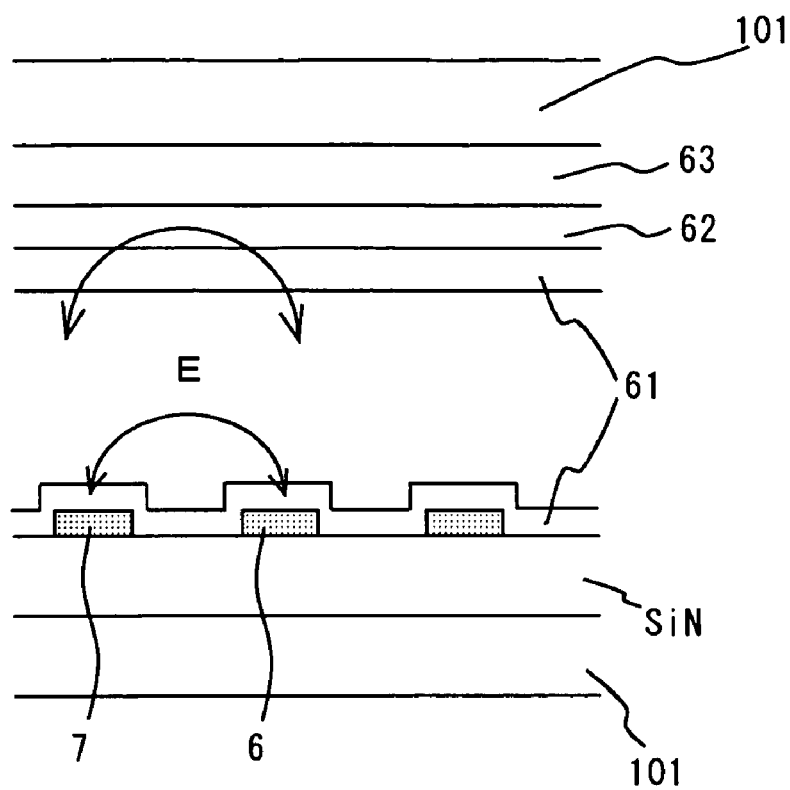
FIG. 6A is a sectional view of a major part of a liquid crystal display device of IPS mode.
Figure 6B:
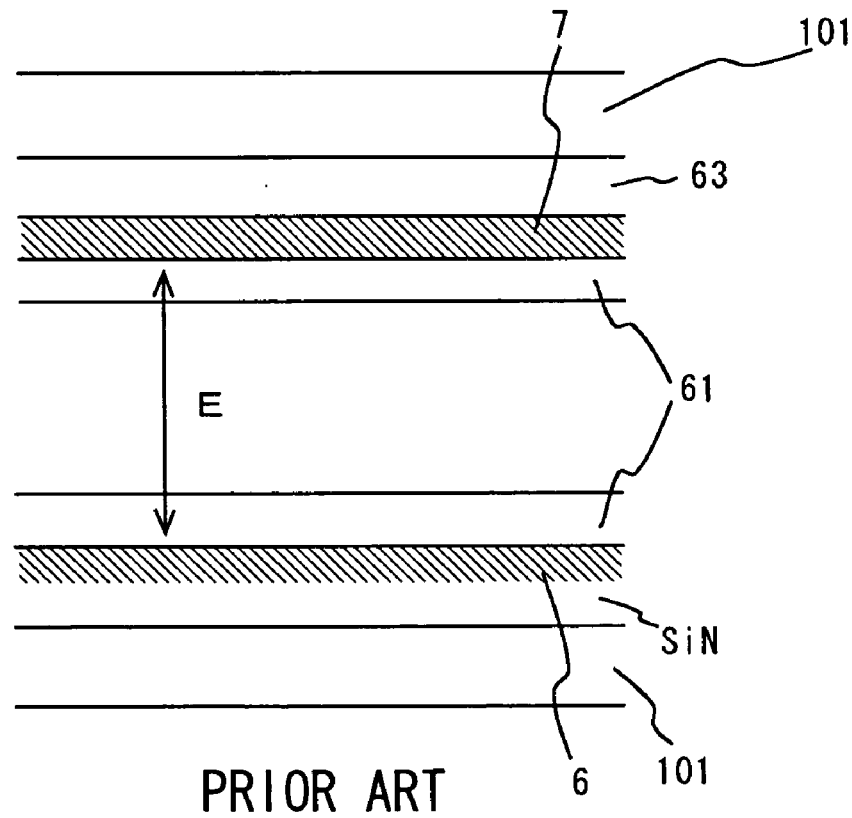
FIG. 6B is a sectional view of a major part of a liquid crystal display device of TN mode.

In a standard liquid crystal display device of the IPS mode, an active area of the liquid crystal is surrounded by lamination of dielectric films, such as an alignment layer (PI) 61, an protective layer (OC) 62, a color material of a color filter (CF) 63, a glass material of an insulative substrate 101, and so on, as shown in FIG. 6A. An electric field E for driving the liquid crystal, created between the pixel electrode 6 and the common electrode 7, extends into the laminated films. In the liquid crystal display device of the TN mode, on the other hand, the pixel electrode 6 and the common electrode 7 are placed face to face, and an electric field E for driving the liquid crystal is created only between the pixel electrode 6 and the common electrode 7, as shown in FIG. 6B. Hence, though the TN mode can avoid image sticking by preventing DC component between the pixel electrode 6 and the common electrode 7, the IPS mode cannot eliminate the image sticking by the conventional offset correction method due to a residual DC voltage left in the dielectric lamination films.

Figure 2:
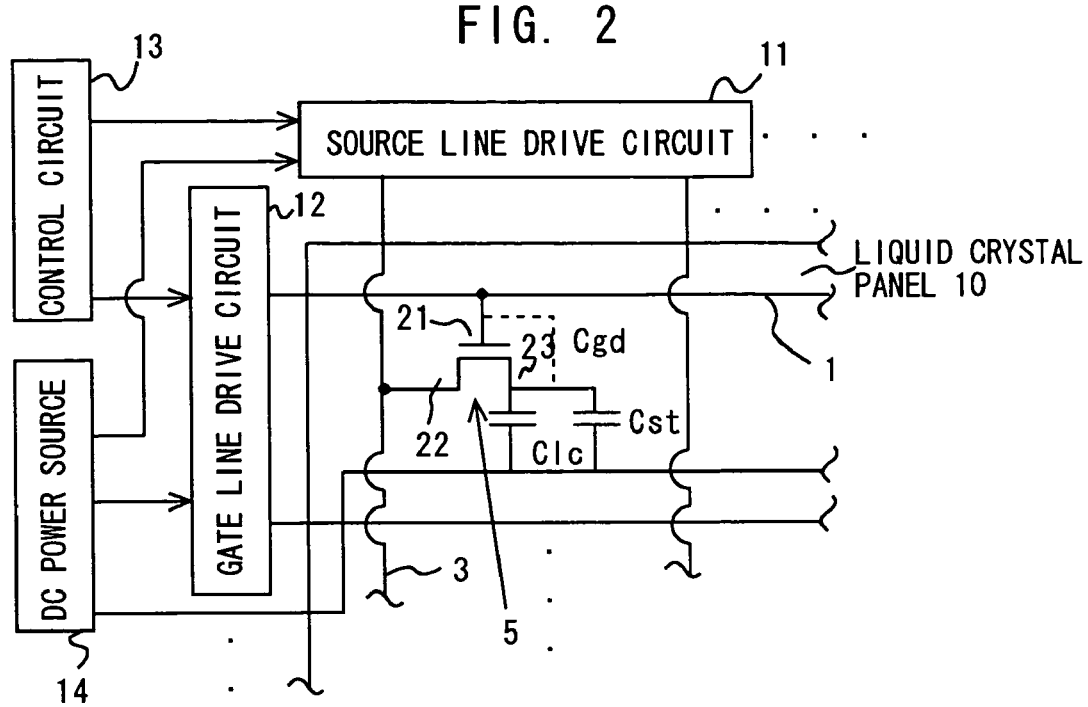
FIG. 2 is a circuit diagram of a liquid crystal display device according to an embodiment of the present invention.

Referring then to FIG. 2, a circuit diagram of a liquid crystal display device of the IPS mode is shown. As shown in FIG. 2, a plurality of the horizontal gate lines 1 and a plurality of the vertical source lines 3 cross perpendicularly. The area surrounded by the gate line 1 and the source line 3 is one pixel area. The switching element 5 is placed near the crossing point of the two lines. The pixel electrode 6 is connected to a drain electrode 23 and placed parallel to the common electrode 7. The source lines 3 are connected to a source line drive circuit 11 for signal voltage supply. The source line drive circuit 11 supplies a grayscale signal (signal voltage) in accordance with a pixel to be driven to the liquid crystal panel 10. A gate line drive circuit 12 supplies a gate voltage for turning on/off the switching element 5. A common voltage is supplied to the common electrode 7.

The circuit shown in FIG. 2 has capacitance Clc with liquid crystal between the pixel electrode 6 and a counter electrode, capacitance Cgd between the gate and the drain, and storage capacitance Cst. The common electrode 7 is kept at a constant common voltage. On the other hand, a signal voltage 32 is written to the pixel electrode 6 from the switching element 5 through the drain electrode 23, thus controlling an electric field in the liquid crystal layer 9 and displaying images.

Figure 3:
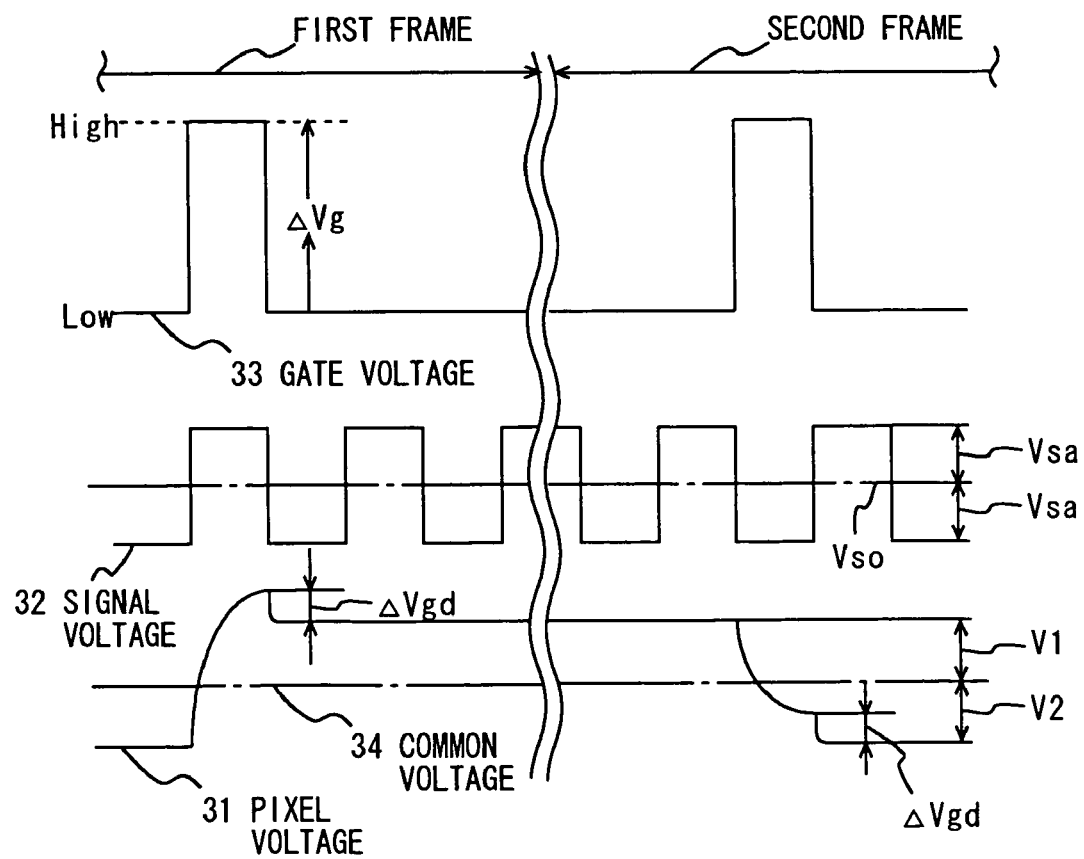
FIG. 3 is a view showing a signal waveform of a liquid crystal display device according to an embodiment of the present invention.

The operation of a voltage of pixel electrode (hereinafter as a pixel voltage 31) will be explained hereinafter with reference to FIG. 3 showing the waveforms of the voltages applied to the gate line 1 and the source line 3. In a standard liquid crystal display device, the relative polarity of the pixel voltage 31 to the common voltage 34 is inverted at every frame so as to avoid deterioration of liquid crystal. Thus, the polarity of the pixel electrode 6 relative to the common voltage 34 is inverted at every frame, a time period in which all the gate lines 1 are selected sequentially.

If a positive pulse with a higher voltage than a threshold voltage of the switching element 5 is applied to the gate electrode 21, the switching element 5 turns on, that is, it turns to a high level, in which a source electrode 22 and the drain electrode 23 have electrical continuity. The signal voltage 32 on the source line 3 is thereby sent to the pixel electrode 6. The signal voltage 32 is an alternating voltage with the center voltage of Vso and the amplitude of Vsa. The amplitude Vsa is in accordance with the grayscale to be displayed. The pixel voltage 31 rises in synchronization with the gate voltage 33, as shown in FIG. 3. Upon switching the gate voltage 33 to a low level to turn off the switching element 5, feedthrough of $\Delta Vgd$ occurs in the pixel voltage 31 due to the capacitance Cgd between the gate and the drain. For one frame period after that, the pixel voltage 31 is retained by the storage capacitance Cst. The common voltage 34 is set so as to equalize the absolute value of a voltage V1 applied to the liquid crystal in the first frame period and that of a voltage V2 applied thereto in the second frame period, and the common voltage 34 of this value is called an optimum Vcom. The common voltage 34 maybe adjusted with a variable resistor in such a way that the absolute values of V1 and V2 are the same.

A voltage drop $\Delta Vgd$ of the pixel voltage 31 due to the feedthrough is expressed by:

$$\Delta Vgd = \Delta Vg \times Cgd/(Clc+Cgd+Cst) \qquad \text{Formula 1}$$

where $\Delta Vg$ is a change in the gate voltage.

After the pixel voltage 31 is kept at a constant value for one frame period, in the second frame period, upon the gate voltage 33 turning again to the high level, the pixel voltage 31 turns to a level of the signal voltage 32 with reverse polarity to the previous (first) frame period. Then, in synchronization with the gate voltage 33 turning back to the low level, the pixel voltage 31 drops as in the first frame period, and further drops by ΔVgd due to the feedthrough.

Of the elements of Formula 1, Clc is dependent on the signal voltage (grayscale voltage). The value of the capacitance Clc with the liquid crystal thus varies according to the grayscale of image applied to the liquid crystal. Cst and Cgd have little voltage dependence.

Figure 4:
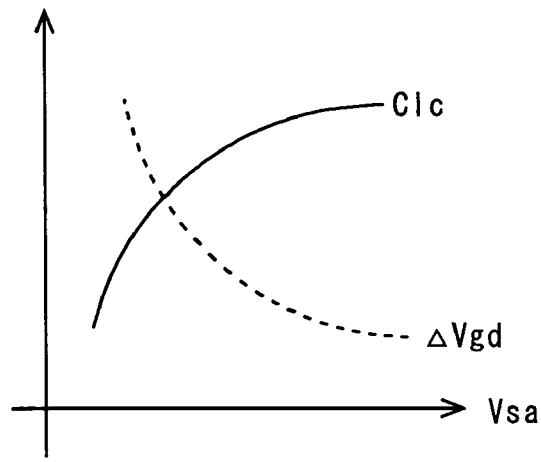
FIG. 4 is a view showing a relationship between a capacitance and a signal voltage amplitude in a liquid crystal display device according to an embodiment of the present invention.

Referring now to FIG. 4, a relationship between Clc and amplitude Vsa of the signal voltage 32 is shown. As the signal voltage 32 increases, Cls increases, and accordingly ΔVgd decreases in inverse proportion to the signal voltage 32. Thus, ΔVgd is not constant but varies with the amplitude of the signal voltage 32, as expressed by Formula 1. Hence, in order to equalize the absolute value of the voltage V1 applied in the first frame period and that of the voltage V2 applied in the second frame period in each grayscale, it is necessary to set the value of Vso in accordance with changes in ΔVgd. This is called the offset correction. TN liquid crystal display devices generally prevent the image sticking with this method. Another method to prevent the image sticking is to set a high value for Vso at the grayscale with small_Vsa, as described above. This embodiment sets a value of Vso for preventing the image sticking in the IPS liquid crystal display device without using the above method of the Vso setting.

A method of setting Vso will be explained below. Referring to FIGS. 2 and 3, a control circuit 13 controls the output timing and the value of the gate voltage 33 output from the gate line drive circuit 12, the signal voltage 32 output from the source line drive circuit 11, and the common voltage 34 applied to the common electrode 7. For example, with 256 levels of grayscale reproduction, a given value of the signal voltage 32 selected from 256 levels, positive and negative polarities each, of voltages is applied to the pixel electrode so as to reproduce the grayscale. Thus, it is necessary to output the signal voltages 32 of 256 different levels, positive and negative polarities each, from the source line drive circuit 11.

Figure 5:
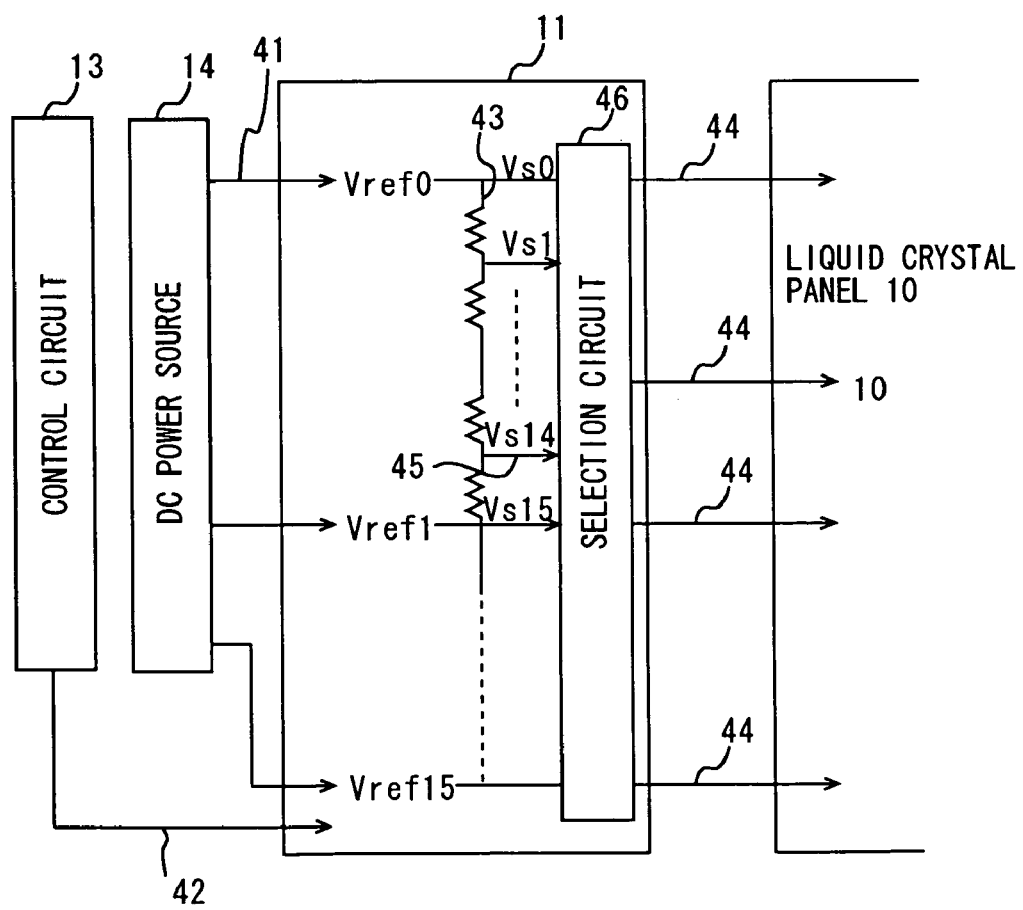
FIG. 5 is a circuit diagram of a liquid crystal display device according to an embodiment of the present invention.

Now, a unit of generating 256 levels of the signal voltages 32 will be explained below. Referring to FIG. 5, it is an explanatory view showing an example of the source line drive circuit 11, a unit of generating 256 levels of the signal voltages. As shown in FIG. 5, there are provided an input terminal 41 of the source line drive circuit 11 from a DC power source 14, an input terminal 42 of the source line drive circuit 11 from the control circuit 13, a divided resistor 43, and an output terminal 44 of the source line drive circuit 11. The input terminal 42 of the source line drive circuit 11 is connected to the control circuit 13 and control signals are input to the input terminal 42. The input terminal 41 of the source line drive circuit 11, on the other hand, is connected to the DC power source 14 and grayscale reference voltages of 16 different levels (values) are input the input terminal 41. For example, 16 levels of grayscale reference voltages, which are, the first grayscale reference voltage (Vref0), the second grayscale reference voltage (Vref1), to the fifteenth grayscale reference voltage (Vref14), and the sixteenth grayscale reference voltage (Vref15), are applied, respectively, to the input terminals 41 from output terminals of the DC power source 14. Divided resistors 43 connected in series are connected between the input terminals 41.

For example, 15 divided resistors 43 are connected between the input terminal 41 with the first grayscale reference voltage (Vref0) and the input terminal 41 with the second grayscale reference voltage (Vref1). From output terminals 45 placed at each connection of the divided resistors 43, 15 signal voltages of different levels, which are, the signal voltages indicating the first screen voltage (Vs0), the second screen voltage (Vs1) to the sixteenth screen voltage (Vs15), divided by the 15 divided resistors are respectively output. With the signal voltages between all Vref, it is able to generate 256×2 levels of signal voltages; 256 levels at the positive polarity side and 256 levels at the negative polarity side. A given voltage is selected from those signal voltages in a selection circuit 46 and output to the liquid crystal panel 10 through the output terminal 44.

Table 1 shows the grayscale reference voltage Vref input to the source line drive circuit 11, and the amplification Vsa and the center voltage Vso of the signal voltage 32 output from the source line drive voltage 11 according to this embodiment. For example, in the case of the grayscale of 255, the center voltage Vso of the signal voltage 32 input to the source line drive circuit 11 is 7.435V, which is the average of the grayscale reference voltages Vref0=14.670V and Vref15=0.200V. In the grayscale of 0, Vso is 7.355V, the average of Vref7=7.985V and Vref8=6.725V. These set values are determined by a test of examining the degree of image sticking with varying Vref. The set values may be adjusted according to the specifications of the liquid crystal display device. This method can prevent DC component from remaining in the dielectric lamination films, thereby minimizing the image sticking.

TABLE 1

| GRAYSCALE | Vsa | Vso | VOLTAGE VALUE |
|---|---|---|---|
| 255 | 7.235 | 7.435 | Vref0 = 14.670 |
| 240 | 6.410 | 7.313 | Vref1 = 13.723 |
| 192 | 5.210 | 7.135 | Vref2 = 12.345 |
| 127 | 4.000 | 6.955 | Vref3 = 10.955 |
| 64 | 2.800 | 7.097 | Vref4 = 9.897 |
| 32 | 1.950 | 7.198 | Vref5 = 9.148 |
| 1 | 0.700 | 7.347 | Vref6 = 8.047 |
| 0 | 0.630 | 7.355 | Vref7 = 7.985 |
|  |  |  | Vref8 = 6.725 |
|  |  |  | Vref9 = 6.647 |
|  |  |  | Vref10 = 5.248 |
|  |  |  | Vref11 = 4.297 |
|  |  |  | Vref12 = 2.955 |
|  |  |  | Vref13 = 1.925 |
|  |  |  | Vref14 = 0.903 |
|  |  |  | Vref15 = 0.200 |

This embodiment shows a case where the difference (Vso255−Vso127) between Vso at the grayscale of 255 (Vso255) and Vso at the grayscale of 127 (Vso127) is 480 mV, and the difference (Vso0−Vso127) between the Vso at the grayscale of 0 (Vso0) and Vso127 is 400 mV. In other cases, however, either or both of these values can be substantially 0 mV or negative. These values may vary with the combination or the interface state of the alignment layer 61, the protective layer 62, and the material of the color filter 63.

In the liquid crystal display device according to this embodiment, as in standard liquid crystal display devices, adjustment of Vcom is performed with an intermediate grayscale image at the grayscale of 127, which is the intermediate value between the grayscales of 0 and 255. If the liquid crystal display device uses a dot-inversion driving method and so on, it displays a checkered pattern, for example, and adjusts the value of Vcom in such a way that the pixel area with minimum flicker has an optimum Vcom.

Figure 7A:
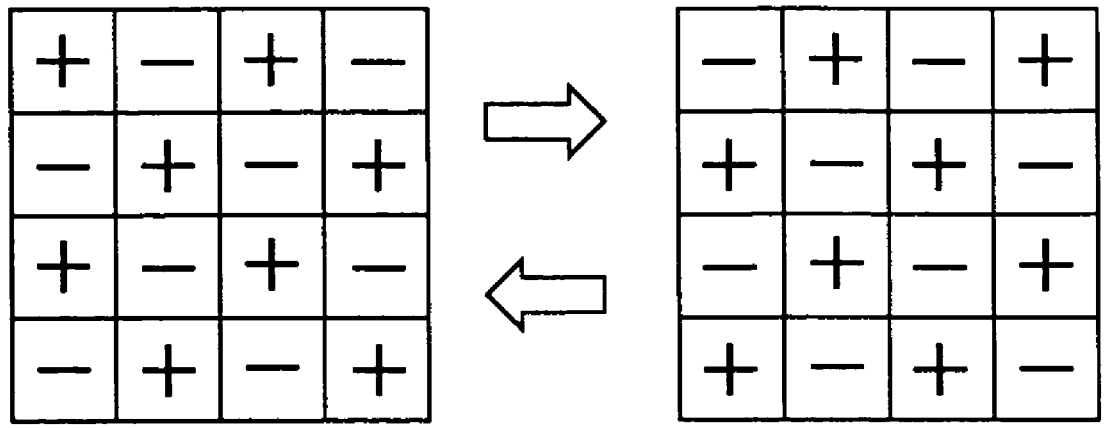
FIG. 7A is a view showing a polarity inversion driving method in a liquid crystal display device according to an embodiment of the present invention.
Figure 7B:
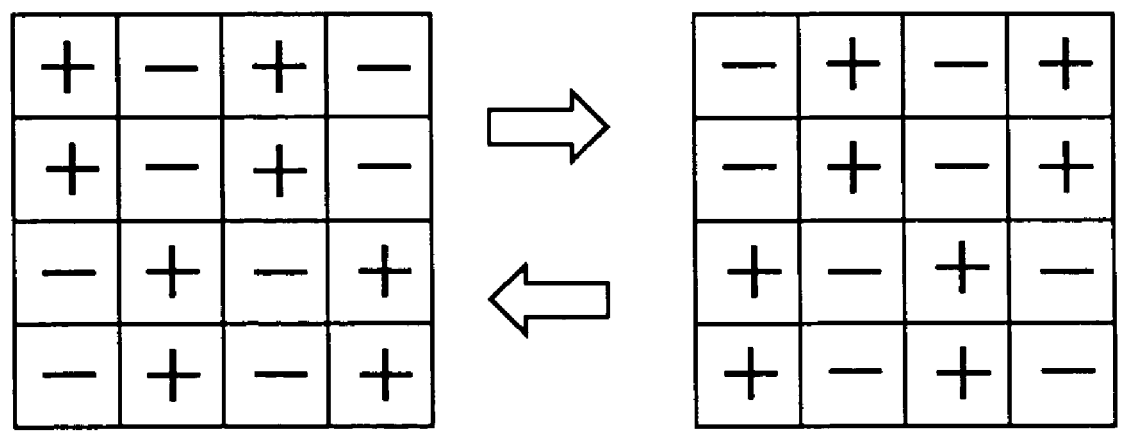
FIG. 7B is a view showing a polarity inversion driving method in a liquid crystal display device according to an embodiment of the present invention.

Hence, though substantially no flicker occurs at the grayscale of 127, flicker is likely to occur at the other grayscales since their Vcom values are off the optimum Vcom value. The flicker of images can be prevented by dot-inversion driving that reverses the polarity from pixel to pixel as shown in FIG. 7A, 1×2 driving as shown in FIG. 7B, and driving that randomly reverses the polarity, which is not shown. In FIGS. 7A and 7B, the symbol "+" indicates that a pixel voltage relative to a common voltage is positive, and the symbol "−", negative. Though the case of adjusting Vcom at the grayscale of 127 is shown here, the adjustment of Vcom may be performed at the other grayscales since it has the same effect.

As described above, the present invention provides a method of driving a liquid crystal display device capable of minimizing image sticking in an IPS liquid crystal display device by setting an average value of the signal voltages in such a way that an average value of a positive polarity voltage and a negative polarity voltage of the signal voltages supplied to the pixel electrode varies with grayscale.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of driving a liquid crystal display device of in-plane-switching mode for applying an electric field substantially parallel to a substrate surface, including a pair of substrates, a liquid crystal layer placed between the pair of substrates, a plurality of gate lines placed above one of the pair of substrates, a plurality of source lines placed to cross the gate lines with an insulative layer interposed therebetween, a switching element placed in a near proximity to a crossing point of the gate lines and the source lines, and a pixel electrode connected to the source lines through the switching element, to which a signal voltage required for image display is supplied by the source line through the switching element, comprising:

a step of setting an average value of the signal voltage in such a way that an average value of a positive polarity voltage and a negative polarity voltage of the pixel electrode varies with a grayscale to be displayed, and a step of inputting the average value of the signal voltage to the pixel electrode.

2. A method of driving a liquid crystal display device according to claim 1, wherein the average value of the signal voltage is an average of two values of grayscale reference voltages input to a source line drive circuit for generating the signal voltage from an external unit.

3. A liquid crystal display device of in-plane-switching mode for applying an electric field substantially parallel to a substrate surface, comprising:

a pair of substrates;

a liquid crystal layer placed between the pair of substrates;

a plurality of gate lines placed above one of the pair of substrates;

a plurality of source lines placed to cross the gate lines with an insulative layer interposed therebetween;

a switching element placed in a near proximity to a crossing point of the gate lines and the source lines; and a pixel electrode connected to the source lines through the switching element, to which a signal voltage required for image display is supplied by the source line through the switching element, wherein an average value of the signal voltage supplied by the source line is set in such a way that an average value of a positive polarity voltage and a negative polarity voltage of the pixel electrode varies with a grayscale to be displayed.

4. A liquid crystal display device of in-plane-switching mode according to claim 3, wherein the average value of the signal voltage is an average of two values of grayscale reference voltages input to a source line drive circuit for generating the signal voltage from an external unit.

* * * * *